(12) United States Patent
Tochigi

(10) Patent No.: US 6,606,207 B2
(45) Date of Patent: Aug. 12, 2003

(54) IMAGE READING LENS AND IMAGE READING APPARATUS USING THE SAME

(75) Inventor: Nobuyuki Tochigi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/042,158

(22) Filed: Jan. 11, 2002

(65) Prior Publication Data

US 2002/0135890 A1 Sep. 26, 2002

(30) Foreign Application Priority Data

Jan. 18, 2001 (JP) ........................ 2001-010030

(51) Int. Cl.⁷ ................ G02B 13/04; G02B 9/62
(52) U.S. Cl. ...................... 359/750; 359/757
(58) Field of Search ................. 359/754, 756, 359/757, 755, 739, 740, 750, 751, 752

(56) References Cited

U.S. PATENT DOCUMENTS

| 3,601,473 A | * | 8/1971 | Mandler et al. ............ 359/752 |
| 5,936,783 A | | 8/1999 | Nakai et al. ............... 359/773 |
| 6,320,704 B1 | | 11/2001 | Noda et al. ............... 359/758 |

FOREIGN PATENT DOCUMENTS

| JP | 11-190820 | 7/1999 |
| JP | 2000-241701 | 9/2000 |
| JP | 2000-249912 | 9/2000 |

* cited by examiner

Primary Examiner—Ricky Mack
Assistant Examiner—Alicia M Harrington
(74) Attorney, Agent, or Firm—Fitzpatrick, Cella, Harper & Scinto

(57) ABSTRACT

The present invention provides a bright image reading lens coping with high resolution and yet having a great depth of focus and a wide angle of field, and an image reading apparatus using the same. The image reading lens includes, in succession from the object side, six lenses, i.e., a meniscus-shaped positive first lens having its convex surface facing the object side, a second lens of which the both lens surfaces are concave surfaces, a third lens of which the both lens surfaces are convex surfaces, a meniscus-shaped fourth lens having its concave surface facing the object side, a meniscus-shaped negative fifth lens having its concave surface facing the object side, and a meniscus-shaped negative sixth lens having its concave surface facing the object side, and satisfies a predetermined condition.

4 Claims, 4 Drawing Sheets

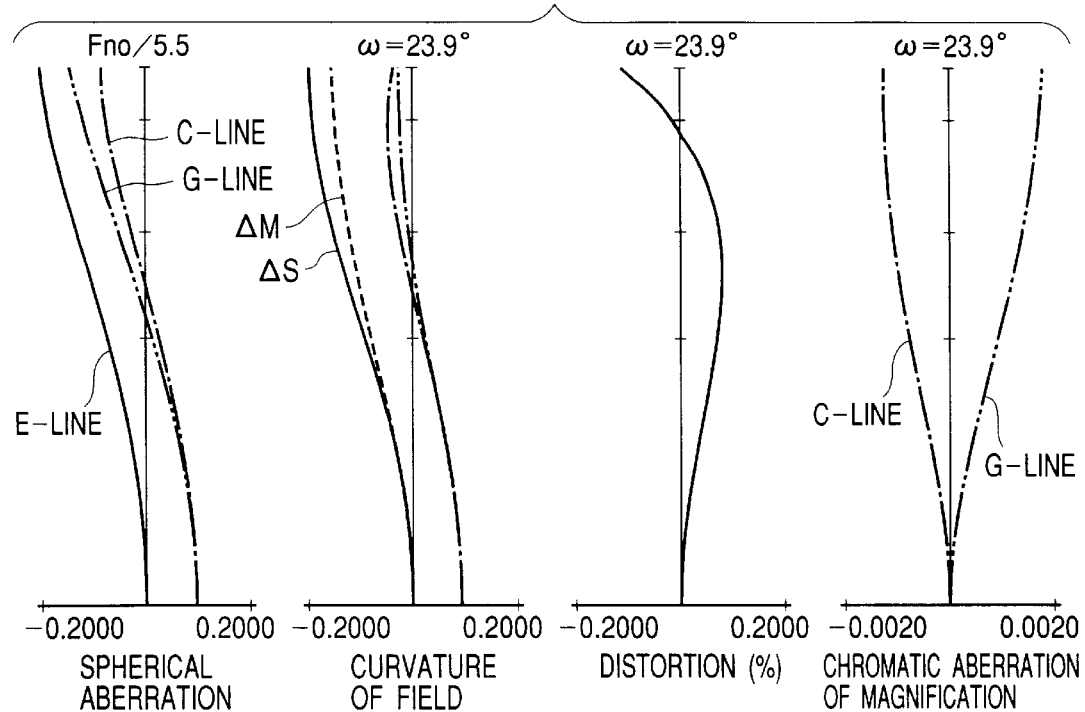
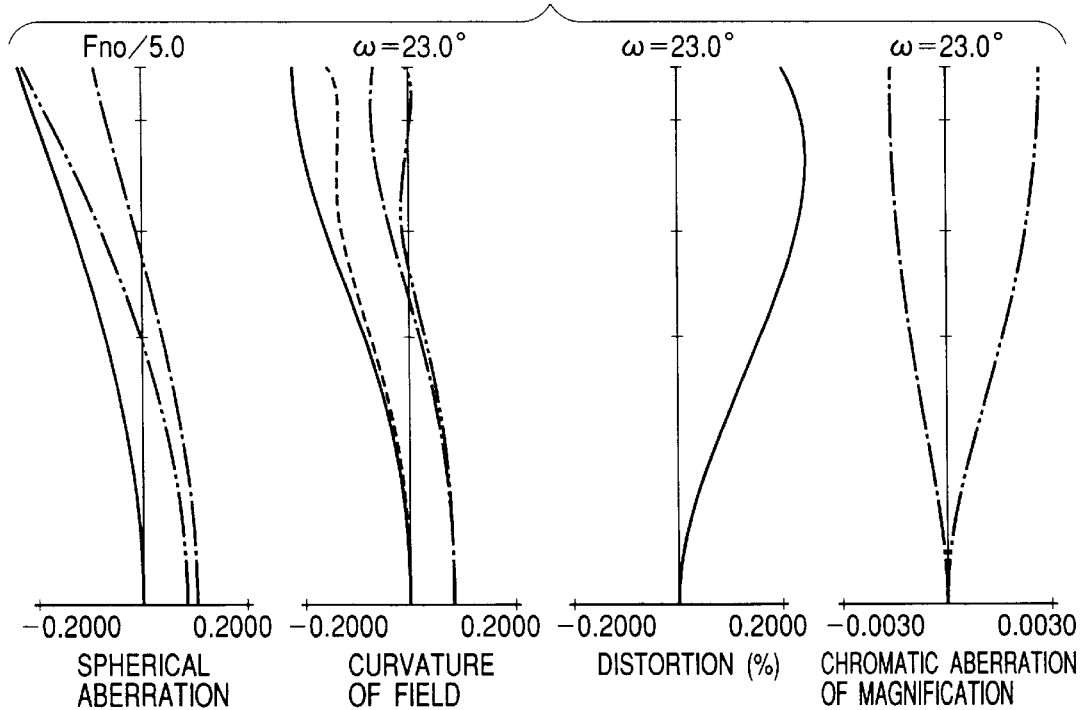

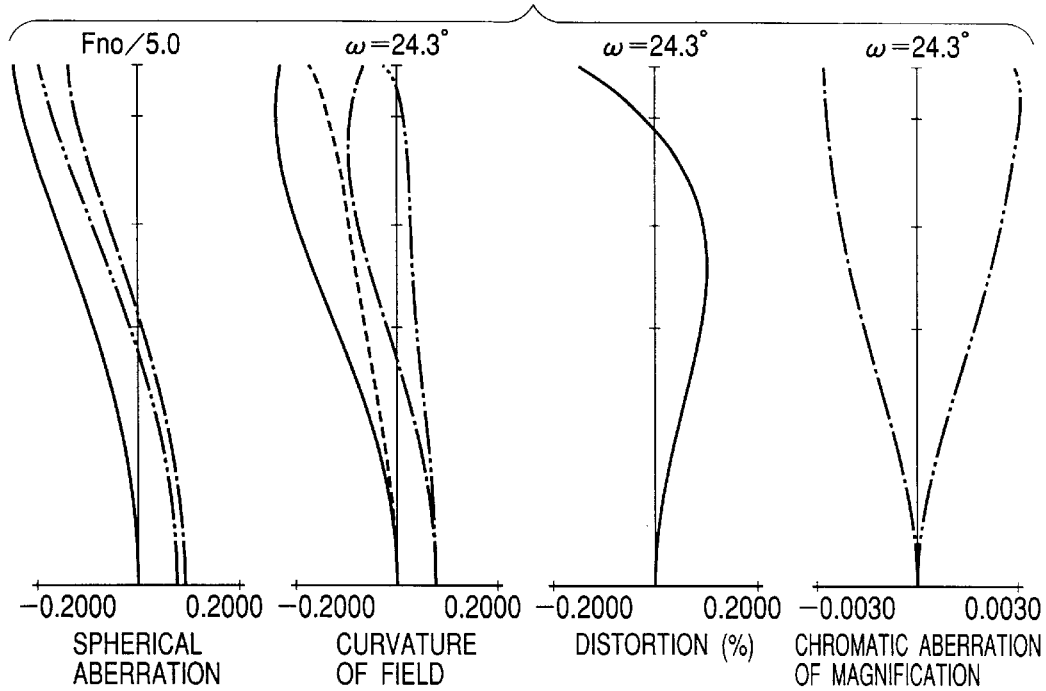
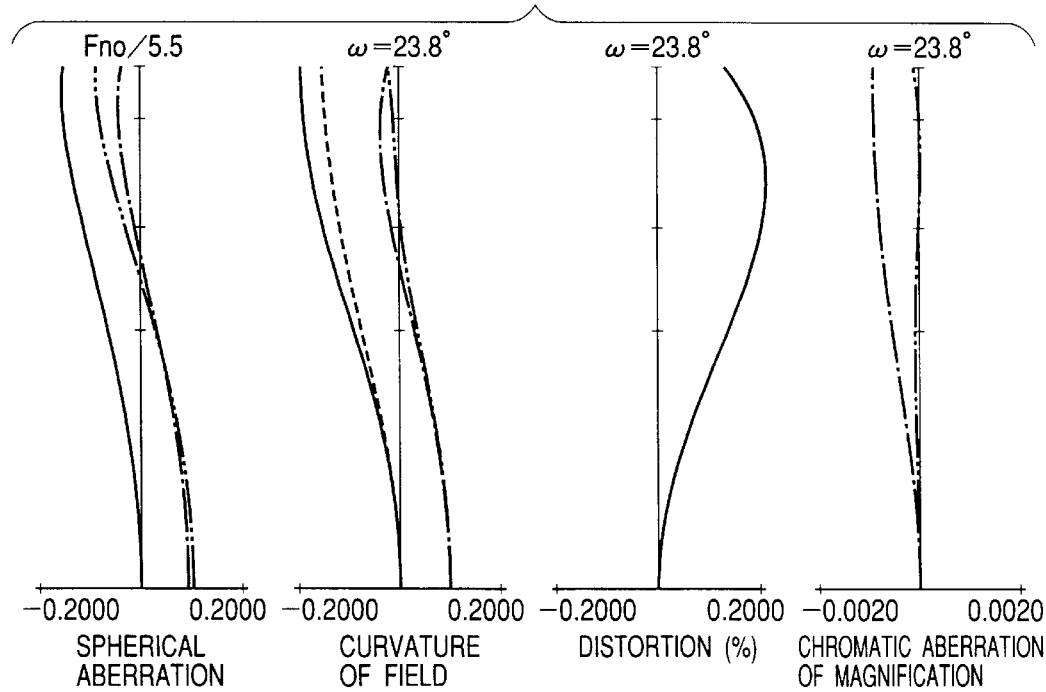

IMAGE READING LENS AND IMAGE READING APPARATUS USING THE SAME

BACKGROUND OF THE INVENTION

1. Field of the Invention

This invention relates to an image reading lens and an image reading apparatus using the same and having a controller circuit for converting the image information of a reading element into an output signal, and particularly is suitable for an image scanner or a film scanner for reading the image information of an image by a reading element such as a line sensor (CCD), and a digital image reading apparatus such as a digital copier or a multifunction printer.

2. Related Background Art

An image scanner, a film scanner or the like is known as an apparatus for reading a paper image or image information on film as digital image information for a computer.

For an image reading lens used in such a scanner apparatus, it is desired that distortion and chromatic aberration be corrected well and that the reduction in the amount of marginal light by vignetting be small. Also, because of the use of reading the image information of an image, it is desired that usually lateral magnification be set within a relatively low magnification range of the order of −0.1 to −1.2 (about one-to-one magnification).

Further, in recent years, the tendency toward downsizing has advanced and the compactness of an optical system layout has been required and so, a wider angle has been required of a projection lens (image reading lens) which determines the optical system layout.

Various image reading lenses of this kind are proposed, for example, in Japanese Patent Application Laid-Open No. 11-190820, Japanese Patent Application Laid-Open No. 2000-241701, Japanese Patent Application Laid-Open No. 2000-249912, etc.

In the above-mentioned Japanese Patent Application Laid-Open No. 11-190820, there is proposed an image reading lens comprising a four-lens construction, but because of the small number, four lenses, if astigmatic difference is suppressed, curvature of field becomes great, and in accordance therewith, spherical aberration is corrected so as to keep balance from the on-axis to the off-axis, and this has led to the problem that such image reading lens is insufficient in performance for an image reading apparatus of high resolution.

In the image reading lens proposed in Japanese Patent Application Laid-Open No. 2000-241701, the number of lens components is increased to five to thereby suppress curvature of field relatively low.

The image reading lens proposed in Japanese Patent Application Laid-Open No. 2000-249912 uses an orthometa type of six-lens construction to thereby make curvature of field small and make the depth of focus great. However, this lens has suffered from the problem that changes in the curvatures of sagittal image field and meridional image field change in opposite directions at a medium angle of field and astigmatic difference occurs greatly and this lens is insufficient in performance for an image reading apparatus of high resolution. Also, the angle of field of this lens is narrow as compared with the lenses of the aforementioned publications, and this has led to the problem of being insufficient to achieve compactness.

In recent years, higher resolution for obtaining a higher quality of image has also come to be required.

SUMMARY OF THE INVENTION

It is an object of the present invention to provide a bright image reading lens of which the lens construction of each lens is appropriately set to thereby cope with high resolution and yet which has a great depth of focus and a wide angle of field, and an image reading apparatus using the same.

It is another object of the present invention to provide a bright image reading lens of six-unit six-lens construction having an angle of field as wide as a half angle of field of 23° or greater and F number (Fno) of the order of 5, and an image reading apparatus using the same.

An image reading lens according to one aspect of the present invention has, in succession from the object side, six lenses, i.e., a meniscus-shaped positive first lens having its convex surface facing the object side, a second lens of which the both lens surfaces are concave surfaces, a third lens of which the both lens surfaces are convex surfaces, a meniscus-shaped fourth lens having its concave surface facing the object side, a meniscus-shaped negative fifth lens having its concave surface facing the object side, and a meniscus-shaped negative sixth lens having its concave surface facing the object side, and when the focal length of the ith lens as counted from the object side is defined as fi and the lens thickness of the fourth lens is defined as d8 and the radius of curvature of the image plane side lens surface of the second lens is defined as r4 and the combined focal length of the fifth lens and the sixth lens is defined as fn and the focal length of the entire system is defined as f, it satisfies the following conditions:

$$0.91 < f5/f6 < 2.78$$

$$-0.27 < d8/fn < -0.16$$

$$2.48 < r4/f < 10.75$$

In a further aspect of the present invention, the image reading lens has a stop between the second lens and the third lens.

In still a further aspect of the present invention, when the combined focal length of the first lens to the fourth lens is defined as fp and the radii of curvature of the object side and image plane side lens surfaces of the sixth lens are defined as r12 and r13, respectively, the image reading lens satisfies the following conditions:

$$-0.95 < fp/fn < -0.71$$

$$-4.80 < (r12 + r13)/(r12 - r13) < -2.75$$

$$2.26 < f/f3 < 2.88$$

An image reading apparatus according to another aspect of the present invention uses the above-described image reading lens to form the image information of an image on the surface of reading means.

BRIEF DESCRIPTION OF THE DRAWINGS

FIG. 2 shows the aberrations of Numerical Value Embodiment 1 of the present invention.

FIG. 3 shows the aberrations of Numerical Value Embodiment 2 of the present invention.

FIG. 4 shows the aberrations of Numerical Value Embodiment 3 of the present invention.

FIG. 5 shows the aberrations of Numerical Value Embodiment 4 of the present invention.

DESCRIPTION OF THE PREFERRED EMBODIMENTS

Figure 1:
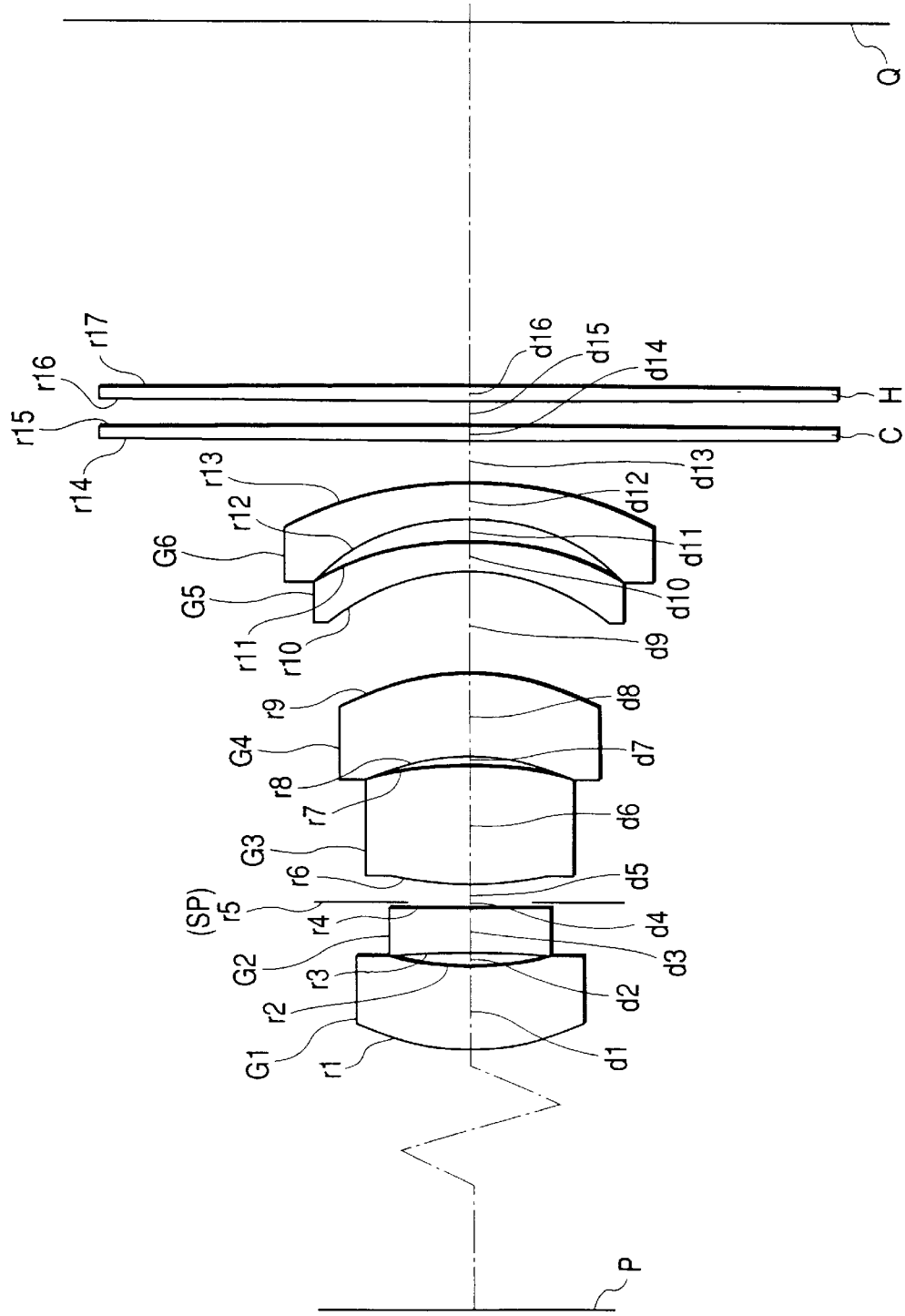
FIG. 1 is a cross-sectional view of a lens according to Numerical Value Embodiment 1 of the present invention.
Figure 6:
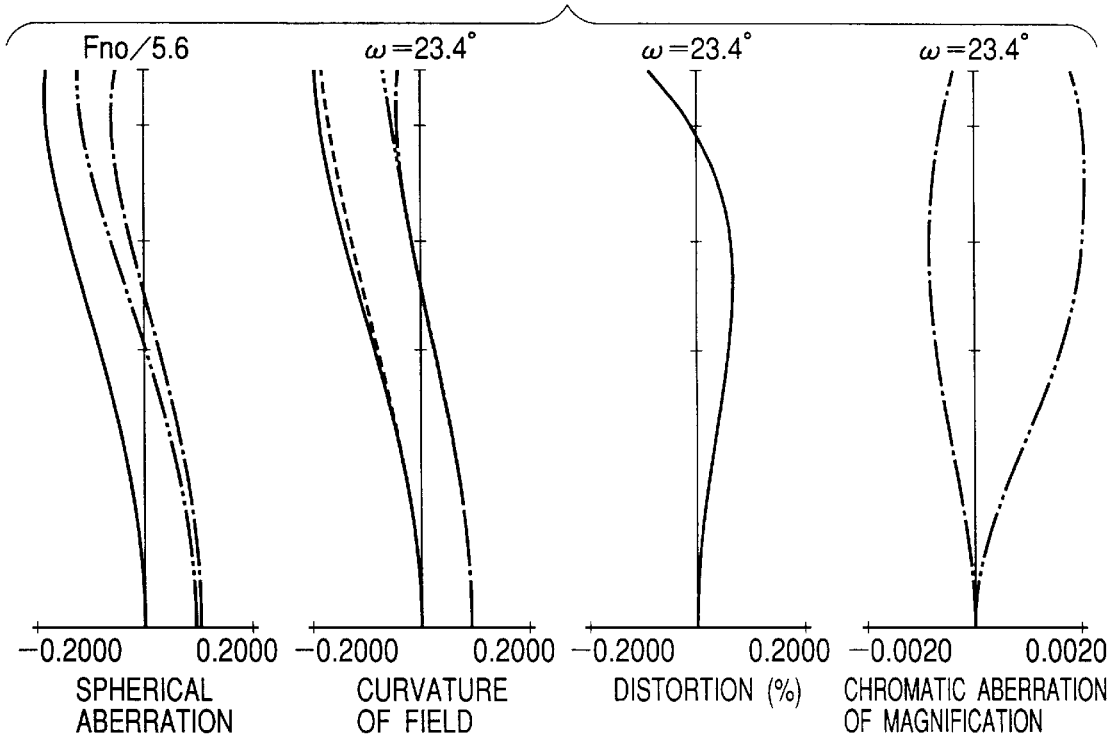
FIG. 6 shows the aberrations of Numerical Value Embodiment 5 of the present invention.

FIG. 1 is a cross-sectional view of an image reading lens according to Numerical Value Embodiment 1 of the present invention which will be described later, and FIGS. 2, 3, 4, 5 and 6 show the aberrations of image reading lenses according to Numerical Value Embodiments 1 to 5 of the present invention which will be described later.

In the cross-sectional view of the lens, the left side is an enlarging side (a side on which the conjugate point is long) and an original (object) surface P side (a side on which an image to be read is provided), and the right side is a reducing side (a side on which the conjugate point is short) and an image plane Q side (a side on which, for example, a CCD as a photoelectric converting element is provided). The letter C designates the cover glass of the CCD, and the letter H denotes protective glass, and these are inserted between the image reading lens and the image plane.

The image reading lens in Numerical Value Embodiment 1 of FIG. 1 comprises, in succession from the object (original) side, six lenses, i.e., a meniscus-shaped positive first lens G1 having its convex surface facing the object side, a second lens G2 of which the both surfaces are concave surfaces, a third lens G3 of which the both surfaces are convex surfaces, a meniscus-shaped fourth lens G4 having its concave surface facing the object side, a meniscus-shaped negative fifth lens G5 having its concave surface facing the object side, and a meniscus-shaped negative sixths lens G6 having its concave surface facing the object side. SP designates a stop provided between the second lens G2 and the third lens G3.

The lens construction of the image reading lens in each of Numerical Value Embodiments 2 to 5 is similar to that of the above-described Numerical Value Embodiment 1, and comprises, in succession from the object (original) side, six lenses, i.e., a meniscus-shaped positive first lens G1 having its convex surface facing the object side, a second lens G2 of which the both lens surfaces are concave surfaces, a third lens G3 of which the both lens surfaces are convex surfaces, a meniscus-shaped fourth lens G4 having its concave surface facing the object side, a meniscus-shaped negative fifth lens G5 having its concave surface facing the object side, and a meniscus-shaped negative sixth lens G6 having its concave surface facing the object side.

As described above, in the present invention, the image reading lens is of a teletype of six-unit six-lens construction of a predetermined shape and the elements thereof are set so as to satisfy the following conditional expressions (1) to (3). That is, when the focal length of the ith lens as counted from the object side is defined as fi and the lens thickness of the fourth lens is defined as d8 and the radius of curvature of the image plane side lens surface of the second lens is defined as r4 and the combined focal length of the fifth lens and the sixth lens is defined as fn and the focal length of the entire system is defined as f, the elements are set so as to satisfy the following conditions:

$$0.91 < f5/f6 < 2.78 \quad (1)$$

$$-0.27 < d8/fn < -0.16 \quad (2)$$

$$2.48 < r4/f < 10.75 \quad (3)$$

The technical meanings of the above-mentioned conditional expressions will now be described.

Conditional expression (1) relates to the ratio between the focal lengths of the fifth and sixth lenses, and is for keeping curvature of field and coma well-balanced and yet making them good. If the focal length of the sixth lens becomes short beyond the upper limit value of conditional expression (1), curvature of field will be aggravated and curvature of field will become great at the medium angle of field of the sagittal image plane, and curvature of field will become small at the vicinity of the maximum angle of field. Conversely on the meridional image plane, curvature of field will become small at the medium angle of field, and curvature of field will become great at the vicinity of the maximum angle of field. Therefore, over the full angle of field, both of the sagittal image plane and the meridional image plane will become not good in any point, and the depth of focus will become small and high resolution will become unobtainable, and this is not good. If the focal length of the fifth lens becomes short beyond the lower limit value of conditional expression (1), coma will be aggravated and high resolution becomes unobtainable, and this is not good.

Conditional expression (2) relates to the ratio between the lens thickness of the fourth lens and the combined focal length of the fifth and sixth lenses, and is for achieving the correction of distortion and shortening the distance from the object surface to the image plane to thereby achieve compactness. If the lens thickness becomes great beyond the upper limit value of conditional expression (2) and the combined power of the fifth and sixth lenses becomes strong, the degree of telephoto ratio will become strong and therefore, compactness will be achieved but distortion will be aggravated, and this is not good. If the lens interval becomes greater, the lens will become bulky, and this is not good. If the power of the fifth and sixth lenses becomes loose beyond the lower limit value of conditional expression (2), the degree of telephoto ratio will become weak and therefore compactness will not be achieved, and this is not good.

Conditional expression (3) relates to the ratio between the radius of curvature of the emergence surface side of the second lens and the focal length of the entire system, and is for correcting spherical aberration well. If the radius of curvature is set beyond the upper limit value and lower limit value of conditional expression (3), spherical aberration will be aggravated and it will become difficult to keep the balance of the focus position through the total angle of field, and this is not good.

Also, in the present invention, to cope with a lens higher in resolution, it is desirable to satisfy at least one of the following conditional expressions (4) to (6):

$$-0.95 < fp/fn < -0.71 \quad (4)$$

$$-4.80 < (r12+r13)/(r12-r13) < -2.75 \quad (5)$$

$$2.26 < f/f3 < 2.88 \quad (6)$$

where fp represents the combined focal length of the first lens to the fourth lens, and r12 and r13 represent the radii of curvature of the object side and image plane side lens surfaces, respectively, of the sixth lens.

The technical meanings of the above-mentioned conditional expressions (4) to (6) will now be described.

Conditional expression (4) relates to the ratio between the combined focal length fp of the first lens to the fourth lens and the combined focal length fn of the fifth lens and the sixth lens, and is chiefly for achieving a wider angle of field and correcting coma and distortion well. If one of the combined focal lengths strengthens beyond the upper limit value and lower limit value of conditional expression (4), the lenses will become incapable of cancelling the aberrations with each other and coma and distortion will be aggravated, and good optical performance will become obtainable only at a narrow angle of field, and this is not good.

Conditional expression (5) relates to the shape of the sixth lens. If the upper limit value of conditional expression (5) is exceeded, the refractive power of the sixth lens will increase and the allotment of the refractive power to the object surface side lens surface of the sixth lens will become great and the aberrations will be aggravated, and this is not good. If the lower limit value of conditional expression (5) is exceeded, the curvatures of the both lens surfaces of the sixth lens will approximate to each other and the manufacture thereof will become difficult, and this is not good.

Conditional expression (6) relates to the allotment of the refractive power of the third lens to the entire system. If the refractive power of the third lens becomes strong beyond the upper limit value of conditional expression (6), spherical aberration will be aggravated, and this is not good. If the refractive power of the third lens becomes weak beyond the lower limit value of conditional expression (6), the telephoto ratio will become weak and compactness and a wider angle of field will become difficult, and this not good.

In the present invention, more preferably the numerical value ranges of the above-mentioned conditional expressions (1) to (6) may be set as follows.

$$1.00 < f5/f6 < 2.60 \tag{1a}$$

$$-0.25 < d8/fn < -0.16 \tag{2a}$$

$$2.70 < r4/f < 10.00 \tag{3a}$$

$$-0.90 < fp/fn < -0.75 \tag{4a}$$

$$-4.50 < (r12+r13)/(r12-r13) < -3.00 \tag{5a}$$

$$2.50 < f/f3 < 2.70 \tag{6a}$$

In the present invention, even if at least one of the above-mentioned conditional expressions (1) to (3) is satisfied, a predetermined effect will be obtained.

Numerical Value Embodiments 1 to 5 of the present invention will now be shown. In Numerical Value Embodiments 1 to 5, ri represents the radius of curvature of the ith surface from the object side, di represents the spacing between the ith surface and the (i+1)th surface from the object side, and ni and vi represent the refractive index and Abbe number, respectively, of the material of the ith lens from the object side.

The aspherical shape is represented by the expression that $$X = \frac{(1/r)H^2}{1+\sqrt{1-(1+k)(H/r)^2}} + BH^4 + CH^6 + DH^8 + EH^{10}$$

when the direction of the optical axis is the X-axis and a direction perpendicular to the optical axis is the H-axis and the direction of travel of light is positive and r is the paraxial radius of curvature and B, C, D and E are a spherical surface coefficients.

The air space between image stand glass (the surface of an original) and the first lens will not be described. f represents the focal length of the entire system, Fno represents the F number when the image distance is infinity, β represents the imaging magnification (image reading magnification), and r14 to r17 represent the surfaces of cover glass C and protective glass H. Also, the relations between the aforementioned respective conditional expressions and the numerical values in the numerical value embodiments are shown in Table 1 below.

Numerical Value Embodiment 1

| f = 37.87 | Fno = 5.50 | β = −0.189 | | |
|---|---|---|---|---|
| r 1 = | 14.178 | d 1 = 4.19 | n1 = 1.69680 | v 1 = 55.5 |
| r 2 = | 20.342 | d 2 = 0.68 | | |
| r 3 = | −32.098 | d 3 = 2.24 | n2 = 1.76182 | v 2 = 26.5 |
| r 4 = | 151.664 | d 4 = 0.28 | | |
| r 5 = | stop | d 5 = 1.00 | | |
| r 6 = | 23.004 | d 6 = 6.20 | n3 = 1.77250 | v 3 = 49.6 |
| r 7 = | −19.472 | d 7 = 0.52 | | |
| r 8 = | −11.661 | d 8 = 4.13 | n4 = 1.74077 | v 4 = 27.8 |
| r 9 = | −13.398 | d 9 = 5.13 | | |
| r10 = | −11.155 | d10 = 1.49 | n5 = 1.62588 | v 5 = 35.7 |
| r11 = | −16.705 | d11 = 1.29 | | |
| r12 = | −10.820 | d12 = 1.79 | n6 = 1.60342 | v 6 = 38.0 |
| r13 = | −19.652 | d13 = 2.30 | | |
| r14 = | ∞ | d14 = 0.70 | n7 = 1.51633 | v 7 = 64.1 |
| r15 = | ∞ | d15 = 1.30 | | |
| r16 = | ∞ | d16 = 0.70 | n8 = 1.51633 | v 8 = 64.1 |
| r17 = | ∞ | | | |

Numerical Value Embodiment 2

| f = 39.62 | Fno = 5.0 | β = −0.189 | | |
|---|---|---|---|---|
| r 1 = | 16.424 | d 1 = 5.07 | n1 = 1.69680 | v 1 = 55.5 |
| r 2 = | 27.592 | d 2 = 0.57 | | |
| r 3 = | −31.720 | d 3 = 1.79 | n2 = 1.76182 | v 2 = 26.5 |
| r 4 = | 158.255 | d 4 = 0.64 | | |
| r 5 = | stop | d 5 = 1.20 | | |
| r 6 = | 26.171 | d 6 = 6.03 | n3 = 1.77250 | v 3 = 49.6 |
| r 7 = | −20.554 | d 7 = 0.54 | | |
| r 8 = | −11.801 | d 8 = 3.47 | n4 = 1.74077 | v 4 = 27.8 |
| r 9 = | −12.930 | d 9 = 5.58 | | |
| r10 = | −11.355 | d10 = 2.39 | n5 = 1.62588 | v 5 = 35.7 |
| r11 = | −18.700 | d11 = 1.17 | | |
| r12 = | −11.860 | d12 = 1.82 | n6 = 1.62588 | v 6 = 35.7 |
| r13 = | −19.709 | d13 = 2.30 | | |
| r14 = | ∞ | d14 = 0.70 | n7 = 1.51633 | v 7 = 64.1 |
| r15 = | ∞ | d15 = 1.30 | | |
| r16 = | ∞ | d16 = 0.70 | n8 = 1.51633 | v 8 = 64.1 |
| r17 = | ∞ | | | | aspherical surface
surface r12
k=1.39997e-02  B=−8.93844e-06  C=9.02373e-08
  D=−3.17409e-09  E=2.26440e-11

Numerical Value Embodiment 3

| f = 37.07 | Fno = 4.99 | β = −0.189 | | |
|---|---|---|---|---|
| r 1 = | 13.954 | d 1 = 5.79 | n1 = 1.69680 | v 1 = 55.5 |
| r 2 = | 19.636 | d 2 = 0.69 | | |
| r 3 = | −32.670 | d 3 = 1.77 | n2 = 1.76182 | v 2 = 26.5 |
| r 4 = | 107.889 | d 4 = 0.30 | | |
| r 5 = | stop | d 5 = 0.99 | | |
| r 6 = | 22.718 | d 6 = 5.93 | n3 = 1.77250 | v 3 = 49.6 |
| r 7 = | −18.701 | d 7 = 0.49 | | |
| r 8 = | −11.563 | d 8 = 4.00 | n4 = 1.80518 | v 4 = 25.4 |
| r 9 = | −13.383 | d 9 = 4.53 | | |
| r10 = | −10.656 | d10 = 1.24 | n5 = 1.60342 | v 5 = 38.0 |
| r11 = | −15.797 | d11 = 0.96 | | |
| r12 = | −11.383 | d12 = 1.47 | n6 = 1.62588 | v 6 = 35.7 |
| r13 = | −19.209 | d13 = 2.30 | | |
| r14 = | ∞ | d14 = 0.70 | n7 = 1.51633 | v 7 = 64.1 |

-continued

| | | | | |
|---|---|---|---|---|
| f = 37.07 | Fno = 4.99 | β = −0.189 | | |
| r15 = | ∞ | d15 = 1.30 | | |
| r16 = | ∞ | d16 = 0.70 | n8 = 1.51633 | v 8 = 64.1 |
| r17 = | ∞ | | | |

Numerical Value Embodiment 4

| | | | | |
|---|---|---|---|---|
| f = 37.73 | Fno = 5.48 | β = −0.189 | | |
| r 1 = | 15.228 | d 1 = 4.60 | n1 = 1.69680 | v 1 = 55.5 |
| r 2 = | 22.436 | d 2 = 0.69 | | |
| r 3 = | −34.673 | d 3 = 3.00 | n2 = 1.76182 | v 2 = 26.5 |
| r 4 = | 104.232 | d 4 = 0.30 | | |
| r 5 = | stop | d 5 = 1.00 | | |
| r 6 = | 23.426 | d 6 = 5.33 | n3 = 1.77250 | v 3 = 49.6 |
| r 7 = | −19.261 | d 7 = 0.44 | | |
| r 8 = | −11.557 | d 8 = 4.44 | n4 = 1.74077 | v 4 = 27.8 |
| r 9 = | −13.679 | d 9 = 5.69 | | |
| r10 = | −14.058 | d10 = 1.50 | n5 = 1.60342 | v 5 = 38.0 |
| r11 = | −19.517 | d11 = 1.76 | | |
| r12 = | −10.343 | d12 = 1.80 | n6 = 1.61293 | v 6 = 37.0 |
| r13 = | −20.413 | d13 = 2.30 | | |
| r14 = | ∞ | d14 = 1.00 | n7 = 1.51633 | v 7 = 64.1 |
| r15 = | ∞ | d15 = 1.30 | | |
| r16 = | ∞ | d16 = 0.70 | n8 = 1.51633 | v 8 = 64.1 |
| r17 = | ∞ | | | |

Numerical Value Embodiment 5

| | | | | |
|---|---|---|---|---|
| f = 38.81 | Fno = 5.60 | β = −0.189 | | |
| r 1 = | 14.157 | d 1 = 3.64 | n1 = 1.69680 | v 1 = 55.5 |
| r 2 = | 18.619 | d 2 = 0.75 | | |
| r 3 = | −29.043 | d 3 = 1.6 | n2 = 1.76182 | v 2 = 26.5 |
| r 4 = | 379.622 | d 4 = 0.26 | | |
| r 5 = | stop | d 5 = 1.00 | | |
| r 6 = | 22.934 | d 6 = 6.27 | n3 = 1.77250 | v 3 = 49.6 |
| r 7 = | −20.175 | d 7 = 0.54 | | |
| r 8 = | −11.718 | d 8 = 3.82 | n4 = 1.74077 | v 4 = 27.8 |
| r 9 = | −13.902 | d 9 = 6.88 | | |
| r10 = | −10.644 | d10 = 1.36 | n5 = 1.62588 | v 5 = 35.7 |
| r11 = | −15.572 | d11 = 1.02 | | |
| r12 = | −11.125 | d12 = 1.80 | n6 = 1.60342 | v 6 = 38.0 |
| r13 = | −17.734 | d13 = 2.30 | | |
| r14 = | ∞ | d14 = 1.00 | n7 = 1.51633 | v 7 = 64.1 |
| r15 = | ∞ | d15 = 1.30 | | |
| r16 = | ∞ | d16 = 0.70 | n8 = 1.51633 | v 8 = 64.1 |
| r17 = | ∞ | | | |

TABLE 1

| | Embodiment 1 | Embodiment 2 | Embodiment 3 | Embodiment 4 | Embodiment 5 |
|---|---|---|---|---|---|
| Conditional Expression (1) | 1.37 | 1.01 | 1.24 | 2.53 | 1.09 |
| Conditional Expression (2) | −0.21 | −0.22 | −0.17 | −0.22 | −0.24 |
| Conditional Expression (3) | 3.99 | 3.99 | 2.91 | 2.76 | 9.77 |
| Conditional Expression (4) | −0.86 | −0.84 | −0.82 | −0.85 | −0.79 |
| Conditional Expression (5) | −3.45 | −4.02 | −3.91 | −3.05 | −4.37 |
| Conditional Expression (6) | 2.61 | 2.51 | 2.62 | 2.61 | 2.62 |

[Image Reading Apparatus]

Figure 7:
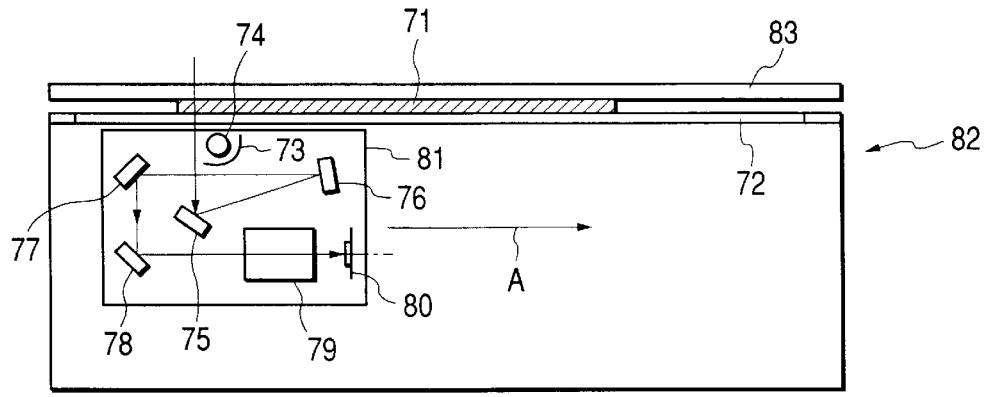
FIG. 7 is a schematic view of essential portions when the image reading lens of the present invention is used in the image reading apparatus of a digital copier.

FIG. 7 is a schematic view of essential portions when the image reading lens according to any one of Numerical Value Embodiments 1 to 5 is applied to the image reading apparatus of a digital copier or the like.

In FIG. 7, the reference numeral 72 designates image stand glass, on the surface of which an image (original) 71 is placed. The reference numeral 81 denotes a carriage integrally containing therein an illuminating light source 74, a reflector 73, a plurality of reflecting mirrors 75, 76, 77, 78, an image reading lens 79 and reading means (line sensor) 80 which will be described later, and the carriage 81 scans in the sub scanning direction (the direction of arrow A in FIG. 7) by a driving device such as a sub scanning motor and reads the image information of the image 71. The illuminating light source 74 comprises, for example, a fluorescent lamp, a halogen lamp or the like. The reflector 73 reflects a beam from the illuminating light source 74 and efficiently illuminates the image. The first, second, third and fourth reflecting mirrors 75, 76, 77 and 78 bend the optical path of the beam from the image 71 in the interior of the carriage 81. The image reading lens 79 is the image reading lens shown in any one of the above-described Numerical Value Embodiments 1 to 5, and causes a beam based on the image information of the image 71 to be imaged on the surface of the reading means 80. The reading means 80 comprises a line sensor (CCD). The reference numeral 82 designates a main body, and the reference numeral 83 denotes a pressure plate.

In FIG. 7, the beam emitted from the illuminating light source 74 illuminates the image 71 directly or through the intermediary of the reflector 73, and the reflected light from the image 71 has its optical path bent in the interior of the carriage 81 through the intermediary of the first, second, third and fourth reflecting mirrors 75, 76, 77 and 78 and is imaged on the surface of the CCD 80 by the image reading lens 79. The carriage 81 is moved in the direction of arrow A (sub scanning direction) by the sub scanning motor to thereby read the image information of the image 71.

While in the present embodiment, the image reading lens of the present invention is applied to the image reading apparatus of a digital copier, this is not restrictive, but the image reading lens of the present invention can of course be also applied to various image reading apparatuses such as an image scanner and a film scanner.

According to the present invention, as previously described, the lens construction of each lens of the image reading lens is appropriately set and each conditional expression is satisfied, whereby there can be achieved a compact and bright image reading lens which can effect reading with very high resolution, and an image reading apparatus using the same.

What is claimed is:
1. An image reading lens comprising, in succession from the object side, six lenses, i.e., a meniscus-shaped positive first lens having its convex surface facing the object side, a second lens of which the both lens surfaces are concave surfaces, a third lens of which the both lens surfaces are convex surfaces, a meniscus-shaped fourth lens having its concave surface facing the object side, a meniscus-shaped negative fifth lens having its concave surface facing the object side, and a meniscus-shaped negative sixth lens having its concave surface facing the object side, characterized in that when the focal length of the ith lens as counted from the object side is defined as fi and the lens thickness of the fourth lens is defined as d8 and the radius of curvature of the image plane side lens surface of the second lens is defined as r4 and the combined focal length of the fifth lens and the sixth lens is defined as fn and the focal length of the entire system is defined as f, the following conditions are satisfied:

$$0.91 < f5/f6 < 2.78$$

$$-0.27 < d8/fn < -0.16$$

$$2.48 < r4/f < 10.75.$$

2. An image reading lens according to claim 1, characterized by a stop between said second lens and said third lens.

3. An image reading lens according to claim 1, characterized in that when the combined focal length of said first lens to said fourth lens is defined as fp and the radii of curvature of the object side and image plane side lens surfaces of said sixth lens are defined as r12 and r13, respectively, the following conditions are satisfied:

$$-0.95 < fp/fn < -0.71$$

$$-4.80 < (r12+r13)/(r12-r13) < -2.75$$

$$2.26 < f/f3 < 2.88.$$

4. An image reading apparatus characterized by an image reading lens according to any one of claims 1 to 3, reading means by which the image information of an image is formed on a reading surface by the use of said image reading lens, and a controller circuit for converting the image information of said reading means into an output signal.

* * * * *